United States Patent [19]

Wiedmann et al.

[11] Patent Number: 5,848,477
[45] Date of Patent: Dec. 15, 1998

[54] COORDINATE MEASURING APPARATUS HAVING A SPATIALLY ADJUSTABLE PROBE PIN

[75] Inventors: Wolfgang Wiedmann; Ralf Bernhardt, both of Aalen; Ronald Lonardoni, Westhausen, all of Germany

[73] Assignee: Carl-Zeiss-Stiftung, Heidenheim, Germany

[21] Appl. No.: 798,540

[22] Filed: Feb. 11, 1997

[30] Foreign Application Priority Data

Feb. 16, 1996 [DE] Germany ............... 196 05 776.0

[51] Int. Cl.⁶ ............................ G01B 5/16; G01B 5/20
[52] U.S. Cl. ..................... 33/503; 33/556; 33/DIG. 1
[58] Field of Search ............... 33/503, 556, 558.01, 33/559, DIG. 1

[56] References Cited

U.S. PATENT DOCUMENTS

| | | |
|---|---|---|
| 4,168,576 | 9/1979 | McMurtry . |
| 4,805,314 | 2/1989 | Hayashi et al. ............... 33/503 |
| 4,888,877 | 12/1989 | Enderle et al. ............... 33/559 |
| 5,251,156 | 10/1993 | Heier et al. ............... 33/503 |

FOREIGN PATENT DOCUMENTS

| | | |
|---|---|---|
| 3434116 | 3/1986 | Germany . |
| 4435401 | 4/1995 | Germany . |

*Primary Examiner*—Christopher W. Fulton
*Attorney, Agent, or Firm*—Walter Ottesen

[57] ABSTRACT

The invention is directed to a coordinate measuring apparatus wherein the drives (3, 5, 6) for the measuring sleds of the apparatus are controlled on circularly-shaped paths to machine-control adjust the spatial orientation of the probe pin 9. The probe pin is attached to a passive rotation-pivot joint and has a probe ball which is driven into one of several centering gaps of a body 10. In this way, a separate drive for the rotation-pivot joint 8 is not needed.

15 Claims, 4 Drawing Sheets

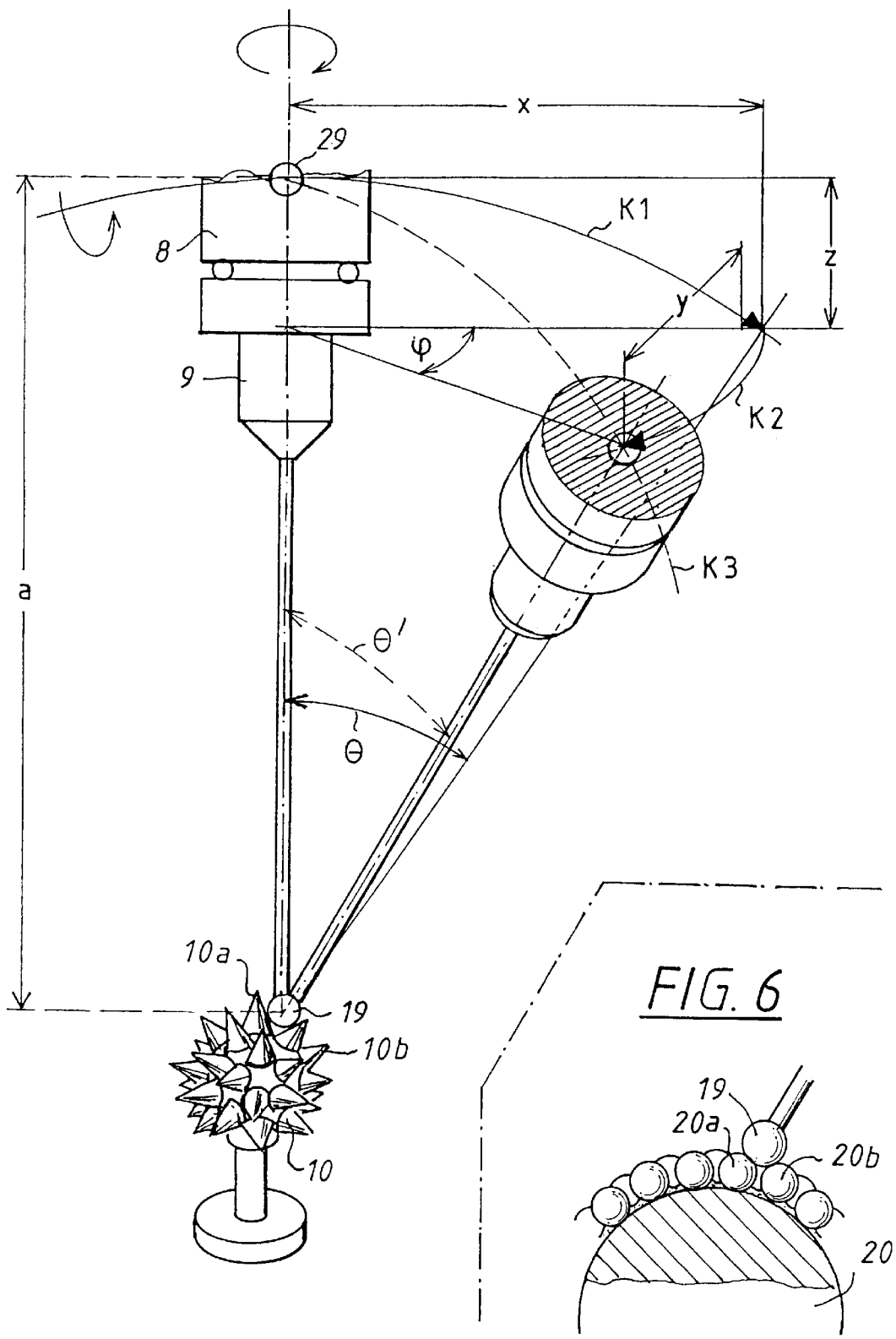

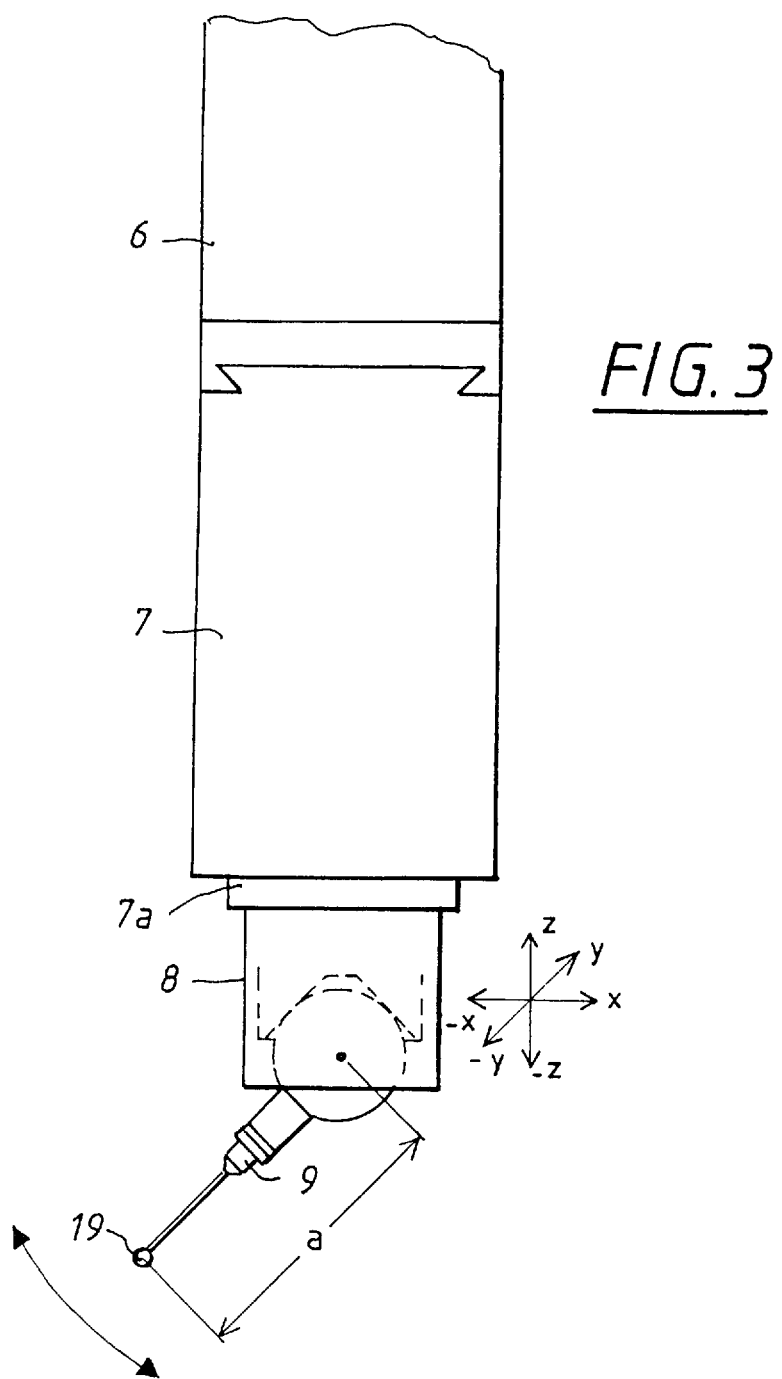

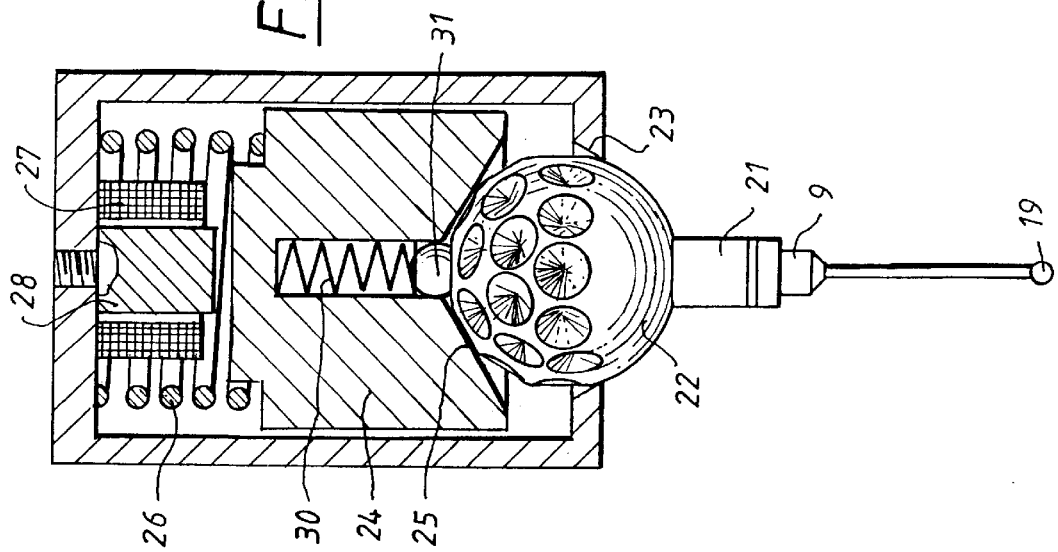
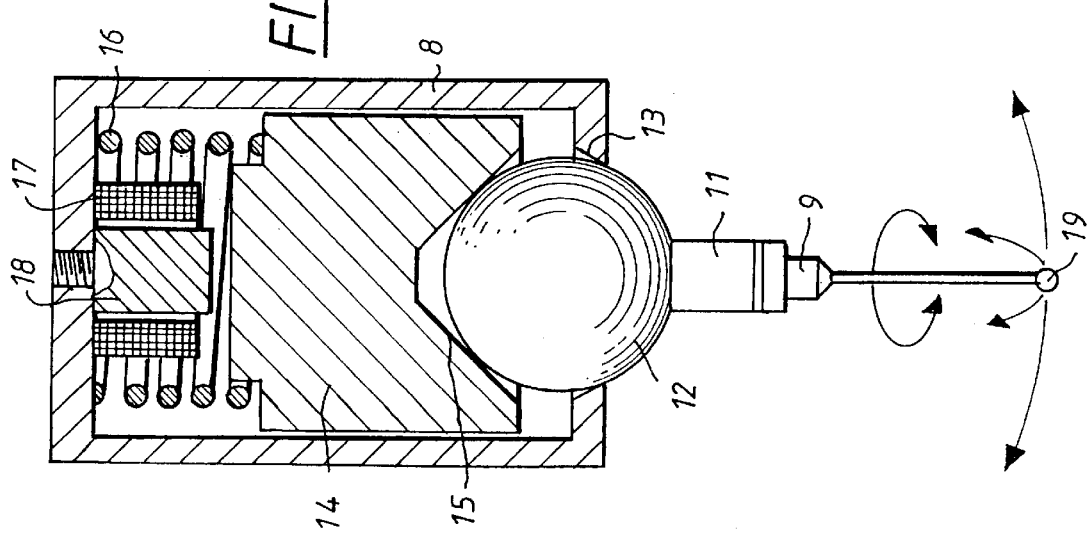

COORDINATE MEASURING APPARATUS HAVING A SPATIALLY ADJUSTABLE PROBE PIN

FIELD OF THE INVENTION

The invention relates to a coordinate measuring apparatus providing for a machine-control adjustment of the orientation of the probe pin thereof.

BACKGROUND OF THE INVENTION

Coordinate measuring apparatus of this kind include, as a rule, a so-called "active rotation-pivot joint" via which the probe pin or the probe head itself is attached to the measuring arm of the coordinate measuring apparatus. The active rotation-pivot joint includes separate drives for the two axes, namely, the rotation axis and the pivot axis. An active rotation-pivot joint is disclosed, for example, in U.S. Pat. No. 4,888,877.

A disadvantage herein is the considerable complexity which is needed for the drive and for the sensors for the feedback of the position of the probe pin, et cetera. This is especially the case when a very compact configuration of the rotation-pivot joint is desired. In general, the probe head itself is pivoted with such an active rotation-pivot joint; whereas, it is only possible with great difficulty to pivot the probe pin by itself. The reason for this is that then the rotation-pivot joint must be so configured with respect to its weight that this weight is significantly below the maximum mass permissible for the deflectable probe pin in the probe head.

U.S. Pat. No. 4,168,576 discloses a passive rotation-pivot joint. There, the probe head is attached via a joint connection on the measuring arm of the coordinate measuring apparatus with the joint connection being provided with latching means or friction springs. The probe head can be brought into another spatial orientation in that the measuring machine moves the shaft of the probe head against an obstacle in such a manner that the shaft snaps, for example, out of the vertical position into a horizontally aligned position. The obstacle can, for example, be an edge of a workpiece or a separate obstacle set up for this purpose on the table of the coordinate measuring apparatus. With this method, the probe cannot be aligned with any special accuracy.

SUMMARY OF THE INVENTION

It is an object of the invention to provide a coordinate measuring apparatus which includes a passive joint for the alignment of the probe and nonetheless provides a precise machine-controlled alignment of the probe.

The coordinate measuring apparatus of the invention is for measuring a workpiece and includes: a probe head unit including a probe head and a probe pin with a contact element for contacting the workpiece; a structure defining a surface for accommodating the workpiece; an assembly moveable relative to the surface for adjusting the spatial orientation ($\theta$, $\phi$) of the probe pin; the probe head unit further including a joint for permitting at least one of the probe head and the probe pin to pivot about at least one axis; and, a releasable holding device for selectively arresting movement of the joint to hold the probe pin in fixed relationship to the assembly and for releasing the joint to permit the joint to move thereby allowing the probe pin to pivot relative to the assembly; a device mounted on the surface and defining a receptacle for receiving the contact element centered therein; a control system for driving the assembly to adjust the spatial orientation ($\theta$, $\phi$) of the probe pin; and, the control system being adapted to move the joint along spatial paths so as to maintain the contact element centered in the receptacle.

According to the invention, a device is attached in the work area of the coordinate measuring apparatus by which the contact body (that is, the probe ball of the probe pin) can be accommodated so as to be centered. After being keyed into the centering receptacle, and with the rotational and/or pivotal axis released, movement is toward the position of the contact body as the center point with this movement being along circularly-shaped paths. In this way, the drives of the measurement slides of the coordinate measuring apparatus, which must be perforce provided, are utilized to make a machine-controlled adjustment of the probe (probe pin and probe ball) with respect to its spatial orientation and no separate drives for the rotational and pivot axes are required.

In this way, a very precise alignment of the probe is possible because the center point of the probe ball remains spatially fixed in the keyed-in centering receptacle; whereas, the coordinate measuring apparatus travels with precision, which is typical for this apparatus, on a circularly-shaped path. In this way, the desired angle change is provided clearly and with precision. The foregoing considers the constant spacing between the probe ball and the rotational and pivotal axes.

It is advantageous when the device for accommodating the contact body in the centered position thereof is provided with a plurality of centering positions on its surface. This can be provided in that the body of the centering device is configured in the manner of a hedgehog or mace or that the centering positions are defined by a plurality of mutually-adjacent spherical bodies, such as spheres or half-spheres. In this way, with any desired orientation of the probe pin, an accessible centering position is reached into which the probe ball can be keyed. For the case that the probe pin must be rotated or pivoted over a larger angular range, several rotational and/or pivot movements can be carried out sequentially. The centering receptacle can be changed between the individual operations. In this way, it is possible to operate with a centering receptacle which permits keying only out of a limited angular range.

The probe pin is pivotally journalled about two mutually perpendicular axes. These axes can be defined by a cardanic bearing or, for example, by a spherical bearing. It is especially advantageous when this bearing can be clamped or released (for the purpose of effecting the new orientation of the probe pin alignment) via a machine control. This can be achieved with a device built up of a permanent magnet and an electromagnet as disclosed in German patent publication 3,434,116.

BRIEF DESCRIPTION OF THE DRAWINGS

The invention will now be described with reference to the drawings wherein:

FIG. 2 is a detailed schematic of the probe of the apparatus of FIG. 1 in two positions, namely before and after the adjustment operation;

FIG. 3 is a simplified side elevation view of the lower portion of the spindle of the apparatus shown in FIG. 1 with the probe head attached thereto and the rotation-pivot joint for the probe pin;

FIG. 4 is a section view of the rotation-pivot joint of FIG. 3 shown in an enlarged scale;

FIG. 5 is a section view of an alternate embodiment of the rotation-pivot joint of FIG. 4; and, FIG. 6 shows an alternate embodiment for the device 10 for receiving and accommodating the probe ball of FIG. 1 in a centering position.

DESCRIPTION OF THE PREFERRED EMBODIMENTS OF THE INVENTION

Figure 1:
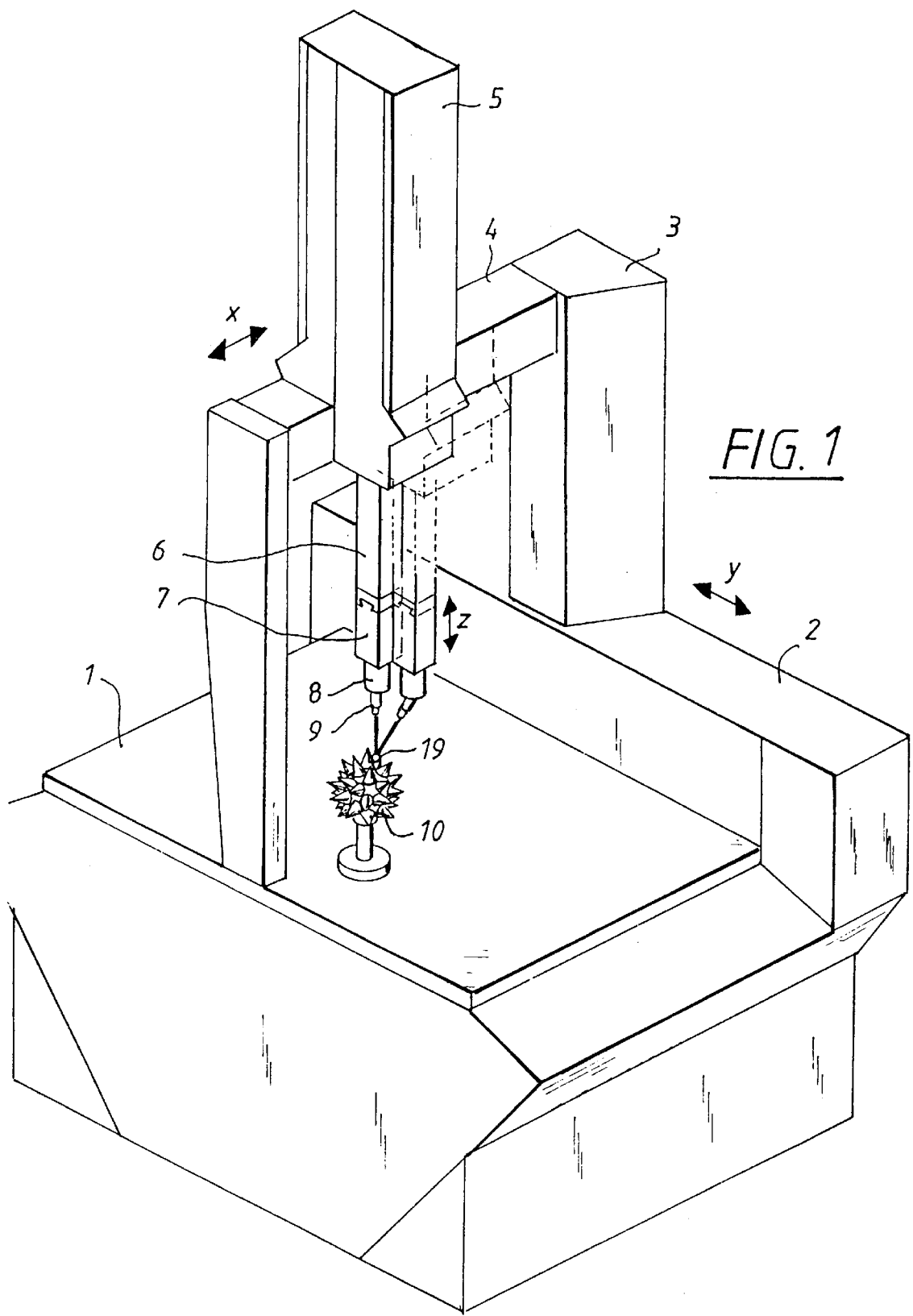
FIG. 1 is a perspective schematic showing a coordinate measuring apparatus of the portal type equipped with a pivotal probe during the method step of newly orientating the probe alignment.

The coordinate measuring apparatus shown in FIG. 1 is of the so-called portal type. The portal 3 is in the form of a bridge as shown. The portal is supported with its first foot on the measuring table 1 via, for example, an air bearing, and is supported with its second foot on a guide track 2 mounted on the measuring table. The portal can be driven via a motor in the direction indicated by the double arrow (y). The transverse slide 5 is movably journalled for movement in the horizontal (x) direction on the transverse beam 4 configured as an x-guide. The measuring arm is configured as a spindle 6 and can be guided in the transverse slide 5 so as to be displaceable in the vertical direction (z). The spindle 6 supports the measuring probe head 7 at its lower end. A probe pin 9 having a probe ball 19 is supported at the lower end of the spindle. The probe pin 9 is supported on the spindle 6 by a passive rotation-pivot joint 8. The probe head 7 is, for example, as shown in U.S. patent application Ser. No. 08/498,344, filed Jul. 5, 1995, and incorporated herein by reference. The probe head 7 shown here is configured of three parallelogram guides mounted one atop the other.

In FIG. 3, the lower portion of the spindle 6 is shown with the probe head 7 attached thereto, the rotation-pivot joint 8 and the probe pin 9 attached to the joint 8 in such a manner that it can be exchanged for another probe pin. The three mutually orthogonal arrows (x, y, z) shown next to the joint 8 in FIG. 3 indicate the directions in which the moveable part 7a of the probe head 7 can be moved. The part 7a can be moved in all three spatial directions. The probe pin 9 is journalled on the spindle 6 so as to yield and deflections of the probe pin 9 are detected in the course of a measuring and contacting operation in a manner known per se by the measuring systems arranged in the probe head 7 and assigned to the deflecting directions.

FIG. 4 shows, in detail, the configuration of the rotation-pivot joint 8. The joint 8 comprises essentially a ball joint and the ball 12 has a holder 11 attached thereto for the probe pin 9. The ball 12 lies in an annular-shaped bearing 13. A cylindrical body 14 clamps the ball 12. The body 14 is linearly guided in the housing 8 and is pressed by a helical spring 16 in the direction toward the annular-shaped bearing 13. The cylindrical body 14 has a conical bore 15 formed in its lower end and the bore 15 presses against the surface of the ball 12. The body 14 is made of soft iron at least in the upper portion thereof.

To release the ball 12, a switching magnet is mounted coaxially to the spring 16 and comprises a permanent magnet 18 and an electromagnet 17 arranged in surrounding relationship thereto. In this way, the field of the permanent magnet 18 is strengthened via a short surge of current in such a manner that the body 14 is pulled to the permanent magnet 18 where it is held until it is repelled by a current pulse of opposite polarity.

During normal measuring operations of the coordinate measuring apparatus, the ball 12 of the rotation-pivot joint 8 is clamped so that the measuring forces are transmitted to the probe head 7 (FIG. 1). The measuring forces are applied by the workpiece to the probe ball 19.

After the measurements in a specific alignment of the probe 10 are completed, the probe pin is aligned anew. In this connection, the following operations are performed. A centering body 10 is set up at a location in the measuring region of the coordinate measuring apparatus as shown in FIGS. 1 and 2. The centering body 10 is configured in the manner of a hedgehog or mace in that it has a plurality of outwardly directed spikes on its spherical surface. These spikes are so close together that recesses are defined between mutually adjacent spikes into which probe ball 19 can key for self-centering. As soon as the probe pin keys self-centering into an accessible recess, the ball 12 is released in the passive rotation-pivot joint 8. Thereafter, the coordinate measuring apparatus drives the center point of the ball 12 on a circular path about the center point of the probe ball 19 by means of a simultaneous control of at least two drives. This is explained in greater detail in FIG. 2.

Referring to FIG. 2, reference numeral 29 identifies the point in the rotation-pivot joint 8 about which the probe pin 9 is rotated and/or pivoted. The distance (a) of the joint 8 from the center point of the probe ball 19 is known and can be determined, for example, by calibrating to a test standard. In the course of the new alignment, either the computer of the coordinate measuring apparatus or a microprocessor in the control of the apparatus computes the circular arc K1 or K2 on which the intersect point 29 is moved so that the desired pivot angle θ or rotational angle φ results. The point 29 is the intersect point of the rotation and pivot axes for a fixed center point of the probe ball 19 and the computation is made from the distance (a) as well as from the desired pivot angles (θ, φ). The control moves the measurement slides simultaneously in two coordinates (x, z) on path K1 and (x, y) on path K2.

In this way, the probe ball 19 remains in the centering gap defined by the two spikes (10a, 10b) and a further spike (not visible in FIG. 2) during which the alignment of the probe pin 9 changes. With an appropriate configuration of the control, it is also possible to move simultaneously in all three spatial directions (x, y, z), (that is, to move on a circular arc lying free in space) in order to bring the probe pin directly from the vertical position shown into the pivoted position also shown in FIG. 2 along the arcuate path K3 shown by a broken line in FIG. 2.

The above-described pivot operation of the probe is performed with the aid of the coordinate measuring apparatus and can always be carried out in one movement as long as the pivot angle is not too great and the opening angle of the centering gap (in which keying takes place) is not exceeded. To provide larger pivot angles, the pivot operation can be conducted in two stages or in multiple stages without difficulty. For this purpose, keying into a centering gap is first made and the probe pin is pivoted about a smaller angle. Thereafter, the probe pin is driven out of the centering gap and keyed into another centering gap with a temporary clamping of the rotation-pivot joint 8. This then permits a further pivoting of the probe pin.

The required centering gaps can be realized in different ways. In lieu of the spikes of the centering body 10, spheres (20a, 20b) of smaller diameter can be attached to sphere 20 of larger diameter utilizing adhesive (see FIG. 6). On the other hand, conical bores can be introduced into the surface of the large sphere 20.

Furthermore, and in lieu of the rotation-pivot joint shown in FIG. 4, a passive latching rotation-pivot joint can be used as shown in FIG. 5.

In the rotation-pivot joint of FIG. 5, the surface of the sphere 22 of the bearing of the joint is provided with a plurality of conical bores and, in the lower end of the clamping part 24, a centric bore is introduced in which a latch ball 31 and a spring 30 are accommodated. Compared to the spring 26 for pressing the part 24 against the sphere 22, the spring 30 has a very low spring constant. In this way, the sphere 22 with the probe pin 9 attached thereto can be alignedly held in discrete angular positions without large forces when the sphere 22 is released before this position is subsequently fixed. This takes place in that the part 24 is released and is pressed by the spring 26 against the surface of the sphere 22 to effect clamping. This is achieved with the aid of the combination of the electromagnet 27 and permanent magnet 28.

It is furthermore not necessarily required that a ball joint be used for journalling the probe pin. For example, in lieu of a ball joint, a cardanic joint can be used or any other desired joint that has at least one and preferably two or three pivot axes. These axes must not necessarily intersect at one point. Even when the axes are in spaced relationship to each other, each can be moved on a circular arc but at different diameters with reference to the center point of the probe ball. As a bearing for the probe pin, the spherical bearing disclosed in German patent publication 4,435,401 can be utilized. The joint must not necessarily be moved along a circular path even though this is an advantageous embodiment. Any desired other path is possible. What is decisive is that the joint is so moved that the contact body 19 remains centered in the device 10.

It is understood that the foregoing description is that of the preferred embodiments of the invention and that various changes and modifications may be made thereto without departing from the spirit and scope of the invention as defined in the appended claims.

What is claimed is:

1. A coordinate measuring apparatus for measuring a workpiece, the coordinate measuring apparatus comprising:
   a probe head unit including a probe head and a probe pin with a contact element for contacting the workpiece;
   a structure for accommodating the workpiece;
   an assembly moveable relative to said structure for adjusting the spatial orientation ($\theta$, $\phi$) of said probe pin;
   said probe head unit further including a joint for permitting at least one of said probe head and said probe pin to pivot about at least one axis; and, a releasable holding device for selectively arresting movement of said joint to hold said probe pin in fixed relationship to said assembly and for releasing said joint to permit said joint to move thereby allowing said probe pin to pivot relative to said assembly;
   a device mounted on said coordinate measuring apparatus and defining a receptacle for receiving said contact element centered therein;
   a control system for driving said assembly to adjust said spatial orientation ($\theta$, $\phi$) of said probe pin; and, said control system being adapted to move said joint along spatial paths so as to maintain said contact element centered in said receptacle.

2. The coordinate measuring apparatus of claim 1, said device being a convex body defining a surface having a plurality of said receptacles formed therein.

3. The coordinate measuring apparatus of claim 2, said convex body being configured in the manner of a hedge hog or a mace.

4. The coordinate measuring apparatus of claim 2, said convex body being configured to have a plurality of spherical bodies thereon to define a plurality of said receptacles.

5. The coordinate measuring apparatus of claim 1, said joint being journalled so as to permit said probe pin to pivot about two mutually perpendicular axes.

6. The coordinate measuring apparatus of claim 5, said joint being a spherical bearing or a cardanic bearing.

7. The coordinate measuring apparatus of claim 1, said releasable holding device including a latching device for latching said joint to permit said probe pin to assume any one of a plurality of predetermined angular positions.

8. The coordinate measuring apparatus of claim 7, said latching device being an electromagnetic device for clamping and unclamping said joint; and, said control system being adapted to drive said electromagnetic device.

9. The coordinate measuring apparatus of claim 8, said electromagnetic device including a permanent magnet and electromagnet driven by said control system for clamping and unclamping said joint.

10. A coordinate measuring apparatus for measuring a workpiece, the coordinate measuring apparatus comprising:
    a probe head unit including a probe head and a probe pin with a contact element for contacting the workpiece;
    a structure for accommodating the workpiece;
    an assembly moveable relative to said structure for adjusting the spatial orientation ($\theta$, $\phi$) of said probe pin;
    said probe head unit further including a pivot means for permitting at least one of said probe head and said probe pin to pivot about at least one axis; and, a releasable holding device for selectively arresting movement of said pivot means to hold said probe pin in fixed relationship to said assembly and for releasing said pivot means to permit said pivot means to move thereby allowing said probe pin to pivot relative to said assembly;
    a device mounted on said coordinate measuring apparatus and defining a receptacle for receiving said contact element centered therein;
    a control system for driving said assembly to adjust said spatial orientation ($\theta$, $\phi$) of said probe pin; and,
    said control system being adapted to move said axis along spatial circular paths referred to the position of said contact element as a center point.

11. A method for aligning a probe pin in a coordinate measuring apparatus including a control system and a probe head unit including a probe head and a probe pin with a contact element for contacting a workpiece, the probe head unit further including a joint for permitting at least one of said probe head and said probe pin to pivot relative to said apparatus, the method comprising the steps of:
    moving said probe pin so that said contact element thereof seats centered in a receptacle of a device mounted on said apparatus;
    utilizing said control system to drive said joint on a path in such a manner that said contact element remains centered in said device and to thereby produce a pivot movement of said probe pin to newly orientate said probe pin; and,
    then moving said probe pin with said contact element out of said receptacle.

12. The method of claim 11, comprising the further steps of:
    inputting to said control system a desired change in the alignment of said probe pin;
    determining the spacing of said contact element from said joint; and,
    computing in said control system the circular path in correspondence to said spacing along which said joint must be made to travel by simultaneously driving several measurement slides of said apparatus to achieve said alignment.

13. The method of claim 11, comprising the further steps of:

sequentially carrying out several individual pivot operations to pivot said probe pin over a larger angular range (θ, φ); and, changing the receptacle centered into between each two of said pivot operations.

14. A method for aligning a probe pin in a coordinate measuring apparatus including a control system and a probe head unit including a probe head and a probe pin with a contact element for contacting a workpiece, the probe head unit further including pivot means for permitting at least one of said probe head and said probe pin to pivot relative to said apparatus about at least one axis, the method comprising the steps of:

moving said probe pin so that said contact element thereof seats centered in a receptacle of a device mounted on said apparatus;

utilizing said control system to drive said pivot means along a spatial circular path referred to the position of said centered contact element to thereby produce a pivot movement of said probe pin while said contact element maintains its position in said receptacle to newly orientate said probe pin; and, then moving said probe pin with said contact element out of said receptacle.

15. The method of claim 14, comprising the further steps of:

inputting to said control system a desired change in the alignment of said probe pin;

determining the spacing of said contact element from said pivot means; and, computing in said control system the circular path in correspondence to said spacing along which said pivot means must be made to travel by simultaneously driving several measurement slides of said apparatus to achieve said alignment.

* * * * *